US006812614B2

(12) United States Patent
Yamamoto et al.

(10) Patent No.: US 6,812,614 B2
(45) Date of Patent: Nov. 2, 2004

(54) ROTOR FOR A SYNCHRONOUS MOTOR DEFINED BY A HYPERBOLIC FUNCTION

(75) Inventors: Tomonaga Yamamoto, Yamanashi (JP); Takuya Maeda, Yamanashi (JP)

(73) Assignee: Fanuc Ltd., Yamanashi (JP)

( * ) Notice: Subject to any disclaimer, the term of this patent is extended or adjusted under 35 U.S.C. 154(b) by 0 days.

(21) Appl. No.: 09/871,642

(22) Filed: Jun. 4, 2001

(65) Prior Publication Data

US 2002/0067096 A1 Jun. 6, 2002

(30) Foreign Application Priority Data

Jun. 16, 2000 (JP) ........................................ 2000-181190

(51) Int. Cl.[7] .......................... H02K 1/22; H02K 19/02; H02K 21/14
(52) U.S. Cl. .................. 310/261; 310/216; 310/156.01; 310/156.38; 310/156.45
(58) Field of Search ....................... 310/156.46, 156.55, 310/156.49, 156.01, 154.35, 154.36, 154.37, 154.38, 261, 264, 273, 40 R, 216, 195, 231, 156.48

(56) References Cited

U.S. PATENT DOCUMENTS

| 4,714,852 | A |   | 12/1987 | Kawada et al. |         |
|-----------|---|---|---------|---------------|---------|
| 4,748,360 | A |   |  5/1988 | Kawada et al. |         |
| 5,786,650 | A | * |  7/1998 | Uchida et al. | 310/156 |
| 6,034,460 | A | * |  3/2000 | Tajima et al. | 310/179 |
| 6,049,153 | A | * |  4/2000 | Nishiyama et al. | 310/156 |
| 6,300,700 | B1 | * | 10/2001 | Nishiyama et al. | 310/156.45 |

FOREIGN PATENT DOCUMENTS

| DE | EP-0641059 A1 | * | 2/1994  |         |           |
|----|---------------|---|---------|---------|-----------|
| EP | 0365689 A1    |   | 5/1990  |         |           |
| EP | 392028 A1     |   | 10/1990 |         |           |
| EP | 0445308 A1    |   | 9/1991  |         |           |
| JP | 358046859 A   | * | 3/1983  | ......... | H02K/21/14 |
| JP | WO-009004875  | * | 10/1988 | ............ | H02K/1/27 |
| JP | 03-207256     |   | 9/1991  |         |           |
| JP | 03207256      |   | 9/1991  |         |           |
| JP | 403207256 A   | * | 9/1991  | ......... | H02K/41/03 |
| JP | 404069040 A   | * | 3/1992  | ......... | H02K/29/00 |
| JP | 405056617 A   | * | 3/1993  | ......... | H02K/21/14 |
| JP | 405137304 A   | * | 6/1993  | ......... | H02K/21/14 |
| JP | WO-009418740  | * | 2/1994  |         |           |
| JP | 406217478 A   | * | 8/1994  | ............ | H02K/1/27 |
| JP | 406217478     | * | 8/1994  | ............ | H02K/1/27 |
| JP | 406245451 A   | * | 9/1994  | ......... | H02K/21/14 |
| JP | 406311679 A   | * | 11/1994 | ............ | H02K/1/27 |
| JP | 11-252840     |   | 9/1999  |         |           |
| JP | 02000197292   | * | 7/2000  | ............ | H02K/1/27 |
| JP | 02000197292 A | * | 7/2000  | ............ | H02K/1/27 |
| JP | 02000350393 A | * | 12/2000 | ............ | H02K/1/27 |
| JP | 02000350393   | * | 12/2000 | ............ | H02K/1/27 |

OTHER PUBLICATIONS

Miltaon Abramowitz and Irene Stegun, Hnadbook of Mathematical Functions with formula, graphs, and mathematical tables, General Publishing Company, Toronto, Canada, ISBN #0–486–61272–4.*

Avallone, Eugene A. and Baumeister, Theodore; Mark's Standard Handbook For Mechanical Engineers, 1996, 10th edi., p. (2–31).*

* cited by examiner

Primary Examiner—Burton S. Mullins
Assistant Examiner—Heba Elkassabgi
(74) Attorney, Agent, or Firm—Staas & Halsey LLP (57) ABSTRACT

A rotor for a synchronous motor capable of increasing output torque and reduce inductance. An outer periphery of each pole of the rotor in a cross section perpendicular to an axis of the rotor is defined on the basis of a curve of a hyperbolic function. Since an outer periphery of one pole of the rotor at a central apex portion is substantially identical with that of a conventional rotor defined by a circular arc, the output torque of the synchronous motor using this rotor is not decreased. At side portions adjacent to the central apex portion, the outer periphery is positioned inner, i.e., closer to the axis of the rotor than the outer periphery defined by the circular arc, so that a gap between the outer periphery of the rotor and an inner periphery of a stator is made greater to reduce the inductance of the synchronous motor.

15 Claims, 5 Drawing Sheets

ROTOR FOR A SYNCHRONOUS MOTOR DEFINED BY A HYPERBOLIC FUNCTION

BACKGROUND OF THE INVENTION

1. Field of the Invention

The present invention relates to a synchronous motor and in particular to a rotor structure of the synchronous motor.

2. Description of the Related Art

In a synchronous motor, a torque generation thereof is determined by a gap between an outer periphery of a central portion of each pole of the rotor and an inner periphery of a stator. The torque generation increases as the gap is set smaller. Inductance of the synchronous motor is determined by a gap between an outer periphery of side portions, i.e., regions between the central portion and circumferential ends of each pole of the rotor and the inner periphery of the stator. The inductance is reduced as the gap is set larger. With the reduce of the inductance, a counter electromotive force produced in a high speed rotation is made smaller to produce an advantageous effect of increasing an output torque (power). Further, the energy efficiency is improved when the inductance is reduced.

Figure 7:
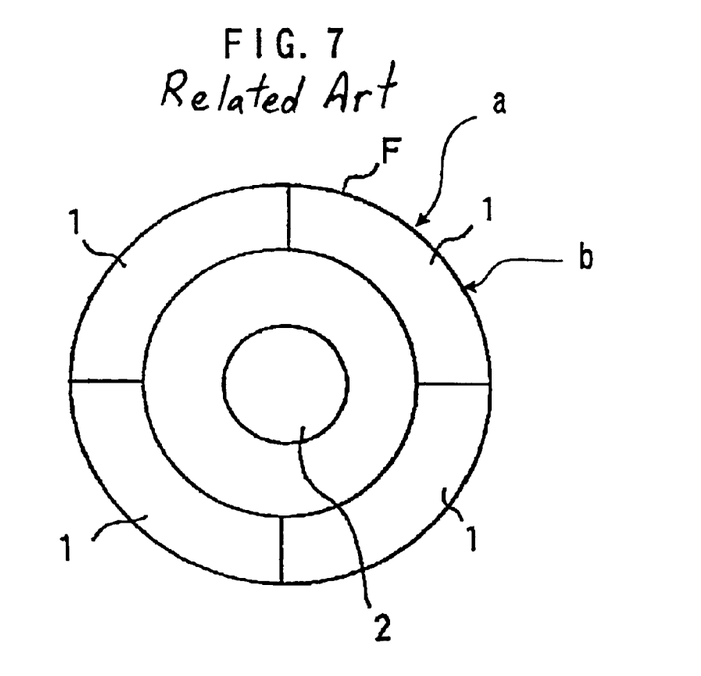
FIG. 7 is a sectional view of a conventional rotor for a synchronous motor having an outer periphery of a circle.
Figure 8:
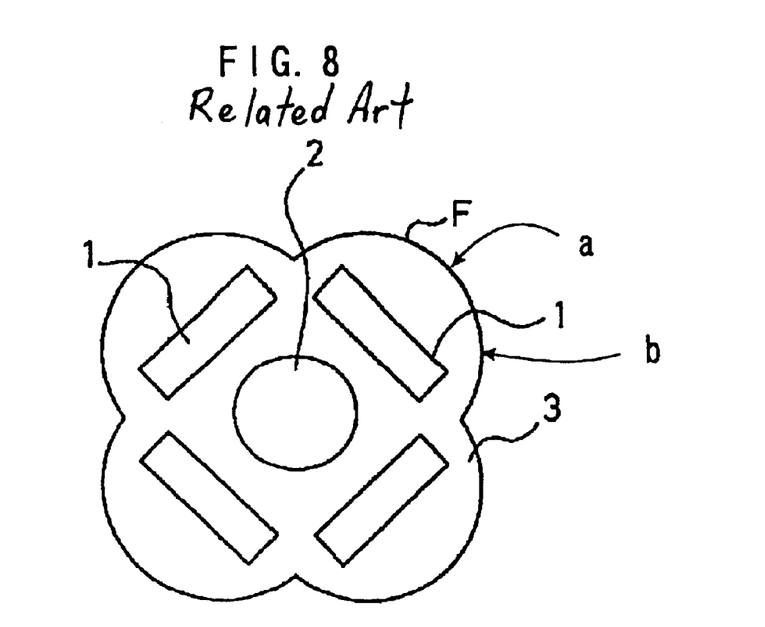
FIG. 8 is a sectional view of a conventional rotor for a synchronous motor having an outer periphery formed by circular arcs with their centers offset from a center of the rotor.

As shown in FIGS. 7 and 8, a conventional rotor of the synchronous motor has an outer periphery of a circle or a shape defined by a combination of circular arcs in a cross section perpendicular to an axis of a rotor. FIG. 7 shows a conventional rotor of the synchronous motor having the circular outer periphery. An outer periphery of each pole of the rotor with magnets 1 embedded therein is defined by a circular arc and a whole outer periphery of the rotor is defined by connecting circular arcs for the predetermined number of poles to form a circle. A shaft 2 is arranged at a center of the rotor. In this example of FIG. 7, the circular arcs defining respective outer peripheries of the magnets for the predetermined number of poles are arranged on a circle having its center coinciding with a central axis of the rotor (a central axis of the shaft 2) to define the whole outer periphery of the rotor to be the circle.

In order to increase the output torque of the synchronous motor using the rotor as shown in FIG. 7, it is conceived that a radius of the circle formed by the combination of circular arcs for respective poles is made larger so as to decrease a gap between a central portion "a" of the rotor and an inner periphery of a stator. However, gaps between the side portions "b" and the inner periphery of the stator are made smaller to increase the inductance resulting in decrease of the output torque at high speed rotation. On the other hand, in order to decrease the inductance, it is conceived that the radius of the circular arc is made smaller to increase the gaps at the side portions "b". However, the gap at the central portion is also increased to decrease the output torque.

Thus, in order to increase the output torque by reducing a gap between the central portion "a" of each pole and the inner periphery of the stator, it has been proposed to set a center of the circular arc of the outer periphery F of each pole to be offset from the center of the rotor, as shown in FIG. 8. In FIG. 8, magnets 1 are embedded in the core 3 of the rotor and the outer periphery F of each pole of the rotor is defined by a circular arc. A center of the circular arc of each pole is offset form the center of the rotor. The circular arcs for respective poles are connected to define the whole periphery of the rotor. According to this arrangement, the gap between the central apex portion "a" and the inner periphery of the stator is made smaller than the gaps between the outer periphery of the side portions "b" and the inner periphery of the rotor. However, with this arrangement, it is not satisfactory to sufficiently increase the output torque and also reduce the inductance of the synchronous motor.

SUMMARY OF THE INVENTION

The present invention is to improve a relation between torque and inductance of the synchronous motor, and an object thereof is to provide a rotor capable of increasing the torque and reducing the inductance of the synchronous motor.

A rotor for a synchronous motor of the present invention comprises a plurality of poles and at least part of an outer periphery of one pole of the rotor in a cross section perpendicular to a central axis of the rotor is defined by a curve of a hyperbolic function.

The most part or the whole part of the outer periphery of the one pole of the rotor may be defined by the curve of the hyperbolic function. Specifically, it is preferable to define a central part of the outer periphery of the one pole by the curve of the hyperbolic function.

The hyperbolic function may be expressed as $R = A - B \cdot (e^{C\theta} + e^{-C\theta})$, where R represents a distance from a central axis of the rotor or a fixed point, $\theta$ represents a rotational angle from a straight line passing through a center of the outer periphery of one pole and perpendicular to the central axis of the rotor, A, B and C are constants and e is a base of natural logarithm or a constant.

Alternatively, the hyperbolic function may be expressed as $X = A - B(e^{CY} + e^{-CY})$ on a X-Y coordinate system with a X axis passing through a center of the outer periphery of one pole of the rotor and perpendicular to a central axis of the rotor, a Y axis perpendicular to the X axis and the central axis of the rotor and an origin as a crossing point of the X axis and the Y axis, where A, B and C are constants and e is a base of natural logarithm or a constant.

In practical machining of the rotor, a region of the outer periphery defined by the curve of the hyperbolic function may be determined based on a train of points on the hyperbolic function curve and a line connecting the train of points by segments of straight lines or curves.

DETAILED DESCRIPTION OF THE PREFERRED EMBODIMENTS

Figure 1:
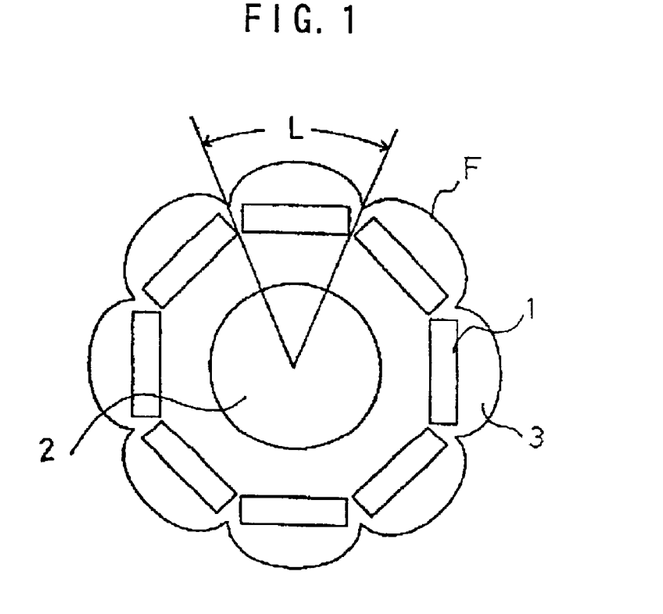
FIG. 1 is a sectional view of a rotor according to a first embodiment of the present invention.

FIG. 1 shows a cross section of a rotor of a synchronous motor on a plane perpendicular to an axis of a rotor shaft 2 according to a first embodiment of the present invention. Magnets 1 are embedded in a rotor core 3 which is fixed to the rotor shaft 2. An outer periphery F of each pole L of the rotor is defined by a curve of a hyperbolic function. Respective outer peripheries F are connected by a predetermined number of poles to form the whole peripheral shape of the rotor in the cross section.

Figure 2:
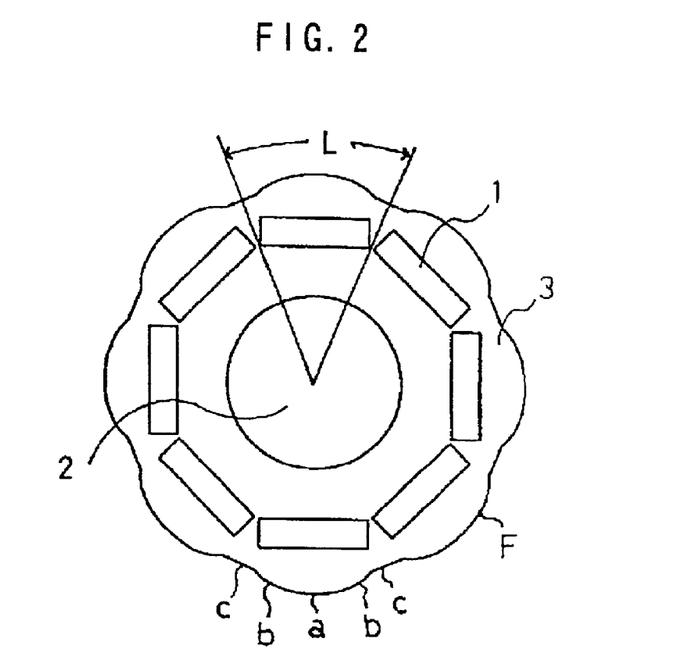
FIG. 2 is a sectional view of a rotor according to a second embodiment of the present invention.

FIG. 2 shows a cross section of a rotor of a synchronous motor on a plane perpendicular to an axis of a rotor shaft 2 according to a second embodiment. Likewise the first embodiment, magnets 1 are embedded in a rotor core 3 which is fixed to the rotor shaft 2. This embodiment differs form the first embodiment in that only a part, i.e., a central portion (an apex portion "a" and side portions "b") of the outer periphery F of each pole L is defined by a curve of a hyperbolic function and end portions "c" connecting with outer peripheries of adjacent poles are not defined by the curve of the hyperbolic function.

Figure 3:
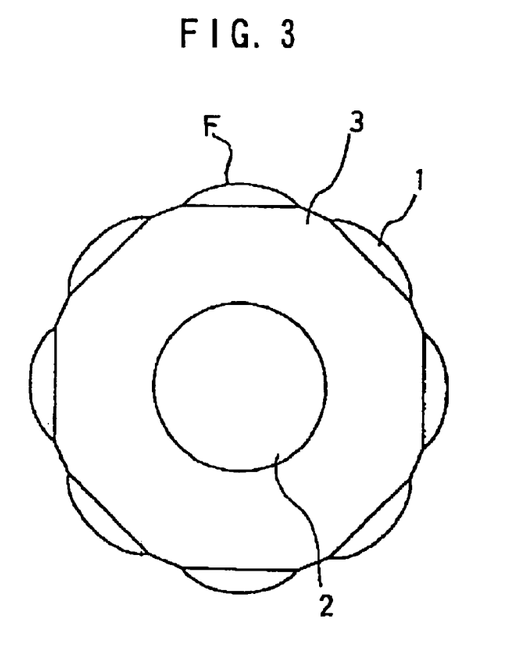
FIG. 3 is a sectional view of a rotor according to a third embodiment of the present invention.

FIG. 3 shows a cross section of a rotor of a synchronous motor on a plane perpendicular to an axis of a rotor shaft 2 according to a third embodiment. Magnets 1 each having an outer periphery defined by a curve of a hyperbolic function are fixed on an outer surface of the rotor core 3.

Figure 4:
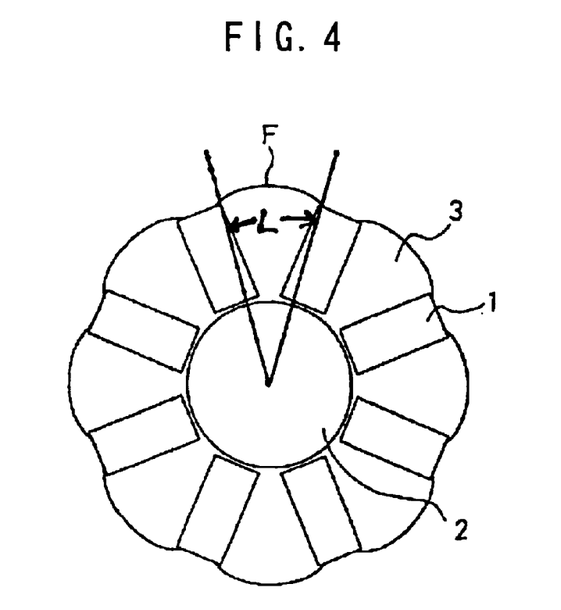
FIG. 4 is a sectional view of a rotor according to a fourth embodiment of the present invention.

FIG. 4 shows a cross section of a rotor of a synchronous motor on a plane perpendicular to an axis of a rotor shaft 2 according to a fourth embodiment. In this embodiment, magnets 1 are arranged radially in the rotor core 3. An outer periphery F of each pole L of the rotor is defined by a curve of a hyperbolic function.

Figure 5:
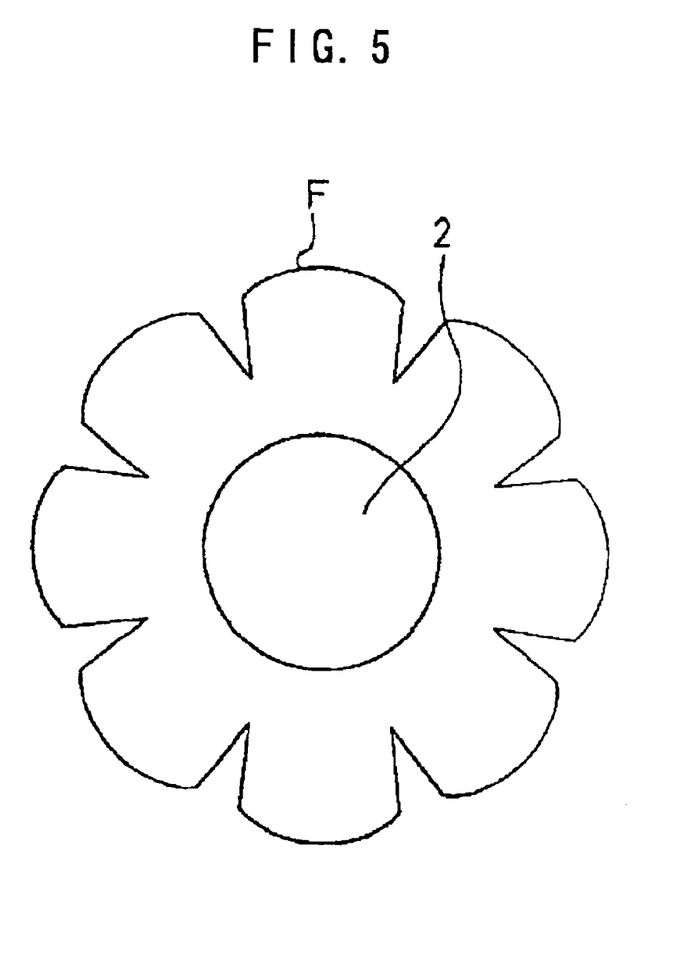
FIG. 5 is a sectional view of a rotor according to a fourth embodiment of the present invention.

FIG. 5 shows a cross section of a rotor of a synchronous motor on a plane perpendicular to an axis of a rotor shaft 2 according to a fifth embodiment. The rotor of this embodiment is suitable for a reluctance motor. An outer periphery F of each pole of the rotor is defined by a curve of a hyperbolic function and a groove is formed between the outer peripheries of the adjacent poles.

Figure 6:
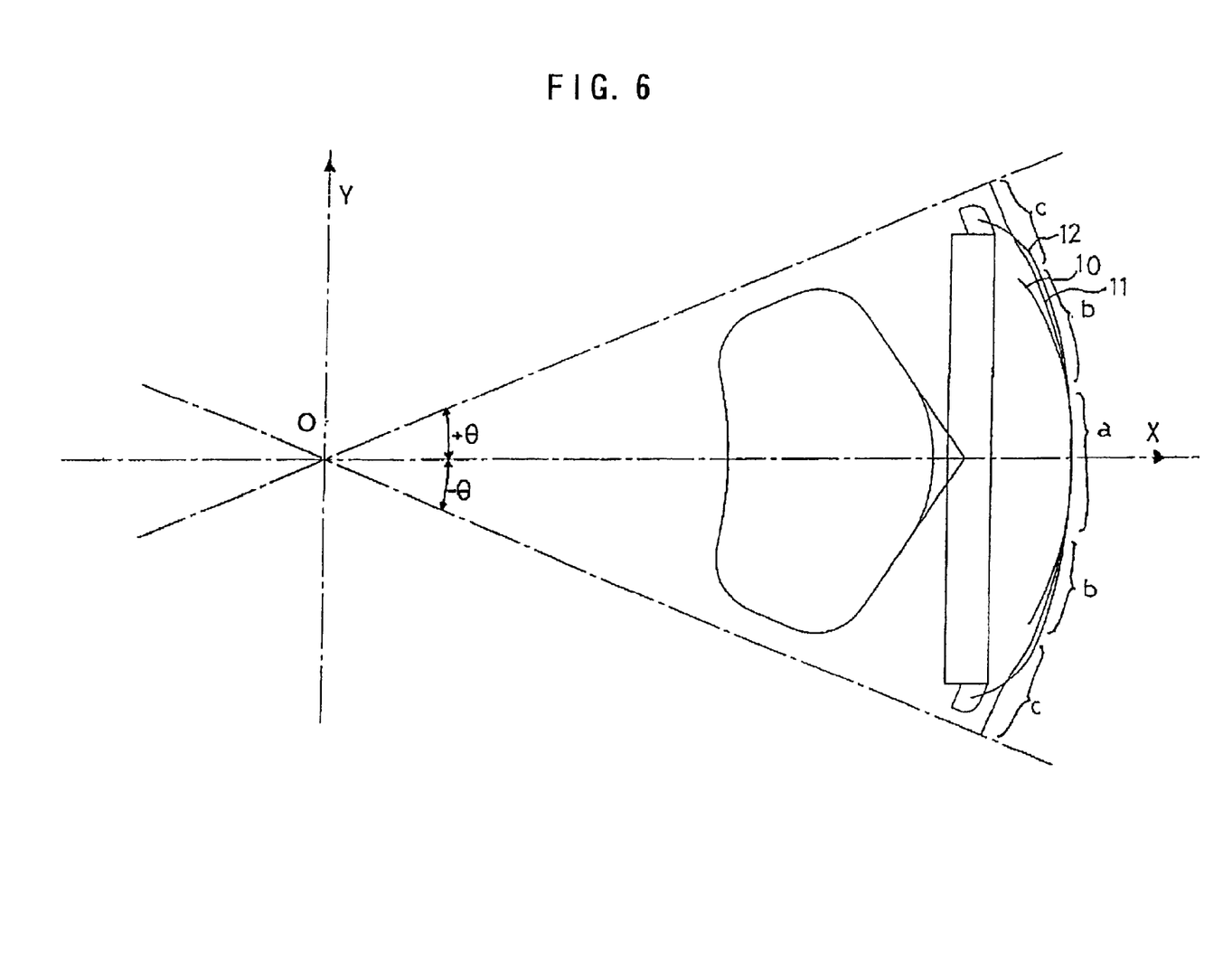
FIG. 6 is a schematic view showing peripheral shapes of one pole of the rotor.

The shape of the outer periphery of one pole of the rotor in cross section will be described in detail referring to FIG. 6. In FIG. 6, an X axis is defined as a line crossing a central axis of the rotor (the rotor shaft 2) perpendicularly and passing a central point of an outer periphery of one pole, an origin O is defined as a crossing point of the X axis and the central axis of the rotor, and a Y axis is defined as a line passing the origin O and perpendicular to the X axis and the central axis of the rotor.

A central angle θ between the X axis and a straight line passing the origin O and a circumferential end of the outer periphery of the one pole is set approximately ±22° to define an angular width of the outer periphery F of the one pole. In FIG. 6, three lines of a curve 10 of a hyperbolic function, a circular arc 11 and a curve 12 of a function (1/cos) are shown.

A general formula of the hyperbolic function for defining the outer periphery of one pole may be expressed by the following equation (1).

$$R = A - B \cdot \cosh(C\theta) = A - B \cdot (e^{C\theta} + e^{-C\theta})/2 \qquad (1)$$

In the above equation (1), R represents a distance from the origin O, θ represents a rotational angle from the X axis. "A" represents a constant value determined based on a distance between an inner periphery of the stator and the origin O (a radius of the inner periphery of the stator). "B" represents a constant value determined based on a distance (gap) between an apex of one pole of the rotor (a central point of one pole) and the inner periphery of the stator. "C" represents a constant value defining a curvature of the hyperbolic function.

An output torque and the inductance are analyzed with respect to shapes of the circular arc, the (1/cos) function and the hyperbolic function shown in FIG. 6 on the basis of FEM (finite element method), to obtain the following results.

|  | Torque | Inductance |
| --- | --- | --- |
| Circular arc | 112 | 1.63 (+11%) |
| 1/cos | 113 | 1.81 (+11%) |
| Hyperbolic function | 110 | 1.47 (+11%) |

As seen from the above analysis results, the torque to be generated by a rotor with outer periphery of the hyperbolic function curve is slightly decreased but not significantly changed when compared with the torque to be generated by a rotor with outer periphery of the circular arc curve and the torque to be generated by a rotor with outer periphery of the (1/cos) function curve. On the other hand, the inductance of a rotor with outer periphery of the hyperbolic function curve is greatly reduced. This means that the output torque can be increased when the inductance is set to be the same, and that the inductance can be increased when the torque is se to be the same. Further, the output torque can be increased and the inductance can be reduced by using the rotor with outer periphery of the hyperbolic function curve in comparison with the rotor with outer periphery of the circular arc curve.

As can be seen form FIG. 6, the three curves are substantially the same at the apex portion "a" of the one pole. However, the hyperbolic function curve 10 is positioned inner, i.e. closer to the origin O, than the circular arc 11 at the side portions "b" on both sides of the apex portion "a" to form the larger gaps between the outer periphery of the rotor and the inner periphery of the stator compared with the circular arc 11. Consequently, it is considered that the output torque is substantially unchanged (because there is no substantial difference between the gaps at the central apex portion), and the inductance is greatly reduced.

Further, it is considered that the inductance of the synchronous motor using the rotor with the outer periphery defied by the (1/cos) function curve 12 is made greater than that when using the rotor with the outer periphery of the circular arc 11 since the (1/cos) function curve 12 is positioned outer than the circular arc 11 at the side portions "b".

The shape of the outer periphery at the apex portion "a" and the side portions "b" of the one pole of the rotor is a significant factor for the output torque and the inductance. However, since end portions "c" of the outer periphery of one pole of the rotor are not significant for the characteristics of the rotor, the end portions "c" may be formed into an arbitrary shape other than the hyperbolic function curve unless it influences the torque and the inductance. Such arrangements have been adopted in the foregoing second to fifth embodiments.

As described above, a synchronous motor with high output torque and low inductance can be obtained with a rotor having an outer periphery defined using the hyperbolic function. The constants A, B and C in the foregoing equation (1) can be determined optimally on the basis of experiments. The constant A is determined on the basis of a radius of the inner periphery of the stator as described (A is determined to be a radius of the inner periphery of the stator in the above example) and the constant B is determined on the basis of the gap between the outer periphery of the rotor and the inner periphery of the stator (B is defined to be a half of the gap in the above example). The constant C defines a curvature of the hyperbolic function curve and thus specifies the outer periphery of the apex portion "a" and the side portions "b". The hyperbolic function curve is determined to be positioned substantially identical with the circular arc 11 at the apex portion "a" and positioned inner than the circular arc 11 at the side portions "b". The degree of positioning inside the circular arc 11 is determined by the constant C. The constant C is determined on the basis of experiments or a simulation based on results of a plurality of experiments, to be optimal so that the output torque is increased and the inductance is reduced.

The curve of the outer periphery of one pole of the rotor may be defined based on the following equation (2) on the X-Y coordinate system as shown in FIG. 6.

$$X = A - B(e^{CY} + e^{-CY}) \quad (2)$$

In the equation (2), A, B and C are constants which are different from the value of the A, B and C in the equation (2). "A" is determined based on a radius of the inner circumference of the stator, "B" is determined based on the gap between the apex of one pole of the rotor and the inner periphery of the stator, and "C" is determined so as to optimize the curvature of the hyperbolic function curve, i.e., the shape of the side portions "b" on both sides of the apex portion "a", as in the equation (1).

In practical machining of the rotor, a region of the outer periphery defined by the curve of the optimum hyperbolic function may be determined based on a train of points on the hyperbolic function curve and a line connecting the train of points by segments of straight lines or curves.

With adopting the rotor according to the present invention in the synchronous motor, the inductance of the motor is reduced when the output torque of the motor is set to the same and the output torque is increased when the inductance is set to the same, as compared with the synchronous motor using the conventional rotor. Particularly, the reduction of inductance improves controllability of the synchronous motor and saves energy.

What is claimed is:

1. A circular rotor for a synchronous motor, comprising: a plurality of poles, where at least a part of an outer periphery of one pole of the rotor has a shape of a hyperbolic cosine curve in a cross section perpendicular to a central axis of the rotor.

2. A circular rotor for a synchronous motor according to claim 1, wherein more than half of the outer periphery of the one pole of the rotor is defined by the hyperbolic cosine curve.

3. A circular rotor for a synchronous motor according to claim 1, wherein all of the outer periphery of the one pole of the rotor is defined by the hyperbolic cosine curve.

4. A circular rotor for a synchronous motor according to claim 1, wherein a central part of the outer periphery of the one pole is defined the hyperbolic cosine curve.

5. A rotor for a synchronous motor according to claim 1, wherein the outer periphery of one pole of the rotor includes a region defined based on the hyperbolic cosine curve and a second region defined based on segments of straight lines or curves.

6. A circular rotor for a synchronous motor according to claim 1, wherein the hyperbolic cosine curve is a function expressing real numbers.

7. A synchronous motor, comprising:
a circular rotor with a plurality of magnetic poles perpendicular to a central axis of the rotor, wherein at least one magnetic pole of the plurality of magnetic poles has an outer edge having a shape of a hyperbolic cosine curve.

8. A synchronous motor according to claim 7, wherein more than half of the outer periphery of the one pole of the rotor is defined by the hyperbolic cosine curve.

9. A synchronous motor according to claim 7, wherein all of the outer periphery of the one pole of the rotor is defined by the hyperbolic cosine curve.

10. A synchronous motor according to claim 7, wherein a central part of the outer periphery of the one pole is defined the hyperbolic cosine curve.

11. A synchronous motor according to claim 7, wherein the outer periphery of one pole of the rotor includes a region defined based on the hyperbolic cosine curve and a second region is defined based on segments of straight lines or curves.

12. A circular rotor for a synchronous motor, comprising:
a plurality of poles, where at least a part of an outer periphery of one pole of the rotor, in a cross section perpendicular to a central axis of the rotor, is defined by a curve of a hyperbolic function, wherein the hyperbolic function is expressed as $R = A - B * (e^{c\theta} + e^{-c\theta})$, where R represents a distance from a central axis of the rotor or a fixed point, $\theta$ represents a rotational angle from a straight line passing through a center of the outer periphery of one pole and perpendicular to the central axis of the rotor, A, B and C are constants and e is a base of natural logarithm or a constant.

13. A circular rotor for a synchronous motor, comprising:
a plurality of poles, where at least a part of an outer periphery of one pole of the rotor, in a cross section perpendicular to a central axis of the rotor, is defined by a curve of a hyperbolic function, wherein the hyperbolic function is expressed as $X = A - B * (e^{cY} + e^{-cY})$ on a X-Y coordinate system with a X axis passing through a center of the outer periphery of one pole of the rotor and perpendicular to a central axis of the rotor, a Y axis perpendicular to the X axis and the central axis of the rotor and an origin as a crossing point of the X axis and the Y axis, where A, B and C are constants and e is a base of natural logarithm or a constant.

14. A synchronous motor, comprising:
a circular rotor with a plurality of magnetic poles perpendicular to a central axis of the rotor, wherein at least one magnetic pole of the plurality of magnetic poles has an outer edge that is defined by a curve of a hyperbolic function, wherein the hyperbolic function is expressed as $R = A - B * (e^{c\theta} + e^{-c\theta})$, where R represents a distance from a central axis of the rotor or a fixed point, $\theta$ represents a rotational angle from a straight line passing through a center of the outer periphery of one pole and perpendicular to the central axis of the rotor, A, B and C are constants and e is a base of natural logarithm or a constant.

15. A synchronous motor, comprising:
a circular rotor with a plurality of magnetic poles perpendicular to a central axis of the rotor, wherein at least one magnetic pole of the plurality of magnetic poles has an outer edge that is defined by a curve of a hyperbolic function, wherein the hyperbolic curve is expressed as $X = A - B * (e^{cY} + e^{-cY})$ on a X-Y coordinate system with a X axis passing through a center of the outer periphery of one pole of the rotor and perpendicular to a central axis of the rotor, a Y axis perpendicular to the X axis and the central axis of the rotor and an origin as a crossing point of the X axis and the Y axis, where A, B and C are constants and e is a base of natural logarithm or a constant.

* * * * *

UNITED STATES PATENT AND TRADEMARK OFFICE
CERTIFICATE OF CORRECTION

PATENT NO. : 6,812,614 B2
DATED : November 2, 2004
INVENTOR(S) : Tomonaga Yamamoto et al.

It is certified that error appears in the above-identified patent and that said Letters Patent is hereby corrected as shown below:

<u>Title page,</u>
Item [56], References Cited, OTHER PUBLICATIONS, change "Miltaon Abramowitz and Irene Stegun, Hnadbook of Mathematical Functions with formula, graphs, and mathematical tables, General Publishing Company Toronto, Canada, ISBN #0-486-61272-4" to -- Miltaon Abramowitz and Irene Stegun, Handbook of Mathematical Functions with formula, graphs, and mathematical tables, General Publishing Company Toronto, Canada, ISBN #0-486-61272-4 --

<u>Column 4,</u>
Line 23, delete "se"

<u>Column 6,</u>
Line 19, change "$^{-\theta}$" to -- $^{-c\theta}$ --

Signed and Sealed this

Nineteenth Day of July, 2005

JON W. DUDAS
*Director of the United States Patent and Trademark Office*

UNITED STATES PATENT AND TRADEMARK OFFICE
CERTIFICATE OF CORRECTION

PATENT NO.       : 6,812,614 B2
APPLICATION NO. : 09/871642
DATED            : November 2, 2004
INVENTOR(S)      : Tomonaga Yamamoto et al.

It is certified that error appears in the above-identified patent and that said Letters Patent is hereby corrected as shown below:

Column 4, line 10 (inside table and under the heading "Inductance"), change "1.81 (+11%)" to --1.81 (+23%)--;

Column 4, line 11 (inside table and under the heading "Inductance"), change "1.47 (+11%)" to --1.47 (+0%)--;

Column 4, line 23, change "increased" to --reduced--;

Column 4, line 23, after "is" insert -- set-- .

Signed and Sealed this

Twentieth Day of February, 2007

JON W. DUDAS
*Director of the United States Patent and Trademark Office*